United States Patent Office 2,811,492
Patented Oct. 29, 1957

2,811,492

POLYAMINE SULFONIC ACID TYPE ADSORPTION COMPOUND

Edwin L. Gustus, Chicago, Ill., assignor to R. J. Strasenburgh Company, Rochester, N. Y., a corporation of New York No Drawing. Application June 4, 1953,
Serial No. 359,641

1 Claim. (Cl. 260—2.1)

The invention relates to adsorption compounds formed by reacting a polyamine acid adsorbing resin with an organic sulfonic acid, and more particularly it relates to adsorption compounds formed by reacting a polyamine acid adsorbing resin with a sulfonic acid surface active agent. It includes adsorption compounds formed by reacting a polyamine acid adsorbing resin of the quaternary ammonium type with a salt of an organic sulfonic acid.

An object of this invention is to provide a cross-linking catalyst which is effective only at elevated temperatures so that one may polymerize a resin composition to a point below the gel point by heating the composition and then have the polymerizing action remain suspended by cooling the composition to room temperature.

Another object of the invention is to provide a cross-linking catalyst which promotes aldehyde and similar cross-linking action but which does not promote an ether type of cross-linkage.

The complex compounds of this invention are also useful for inhibiting mold growth. In the presence of moisture there slowly forms by hydrolysis an anionic surface active agent which is an effective mold inhibitor. The use of the solid resin complex instead of the soluble anionic surface active agent permits the continued maintenance and replacement of small but effective amounts of anionic surface active agent over an extended period of time without the necessity of using the large amounts of the soluble anionic surface active agent which would need to be used in order to counteract losses occurring from dissolution or combination with other proteins than those of the molds.

An object of this invention is also to provide compounds and compositions for the treatment of ulcerative diseases of the alimentary tract.

It is known that lysozyme is secreted along the digestive tract of normal individuals in small amounts and that greatly increased concentration of lysozyme is present in the alimentary tract of persons having an ulcerative disease. Recently, ulcerative lesions have been experimentally produced by the administration of lysozyme, and it is now generally accepted that lysozyme has an etiological role and may locally initiate ulcerative lesions, and particularly lesions of ulcerative colitis and of peptic ulcer.

A number of lysozyme inhibitors are known and some have been tried in the treatment of ulcerative diseases of the alimentary tract either because they were known to be lysozyme inhibitors or for other reasons. Certain surface active agents are highly effective lysozyme inhibitors. One type of anionic surface active agent which has been tried in the treatment of peptic ulcer is sodium lauryl sulfate. This material showed promising results on some patients when administered in large doses over a long period of time, but in many cases it was found that there was concomitant deleterious effects, particularly that in many instances it brought about symptoms resembling a colitis so that after having had some experimental clinical trial its use was largely discontinued.

An object of this invention is the provision of an improved therapeutic composition for the treatment of ulcerative diseases of the alimentary tract, characterized by an excessive secretion of lysozyme.

Other objects of this invention will become apparent from the following description.

I have found that by combining an acid adsorbing resin with a sulfonic acid, there is produced a complex compound which on heating becomes an effective cross-linking catalyst.

I have also found that by combining an acid adsorbing resin with the acids of a sulfonate type of anionic surface active agent there is produced a complex adsorption compound which in the presence of moisture forms slowly by hydrolysis an anionic surface active agent which is an effective mold inhibitor.

I have found that by combining an acid adsorbing resin with the acids of sulfonate type of anionic surface active agent, there is produced a water insoluble complex compound which, on coming in contact with fluids of the alimentary tract, slowly forms by hydrolysis an anionic surface active agent which is an effective lysozyme inhibitor. The administration of the solid resin complex therefore permits the continued maintenance and replacement of concentrations of lysozyme inhibiting anionic surface active agents sufficient to inhibit lysozyme activity without the need of a relatively large and frequent dosage, such as would be required if the soluble anionic surface active agent, which largely combine with food proteins, were used. The undesired effects of the larger necessary dosage of the water soluble anionic surface active agents are thus avoided.

One embodiment of this invention is an acid adsorbing resin having adsorbed thereon an anion of an organic sulfonate or sulfonic acid having the formula $(RSO_3)^-$, where R is a lipophilic aliphatic, alicyclic or aromatic residue having six or more, and preferably six to thirty carbon atoms, and includes alkyl, aryl, aryl-alkyl, alkaryl, cycloalkyl, and these radicals having substituted therein carboxy, hydroxy or amino groups. Examples of such compounds are n-dodecyl sulfonic acid-1, n-dodecyl sulfonic acid-6, naphthalene beta sulfonic acid, para phenylbenzene sulfonic acid, 6-phenyl-n-hexane sulfonic acid-1, 8-phenyl-n-octane sulfonic acid-1, para dodecyl benzene sulfonic acid, para tetradecyl benzene sulfonic acid, comphor-10-sulfonic acid, para dodecyl cyclohexane sulfonic acid.

The resin adsorption product or complex of this invention may be made by contacting an acid adsorbing resin (commonly called an anion exchange resin) with a suitable organic sulfonic acid. The preferred product is obtained by reacting a weak base acid adsorbing resin, such as a polyamine resin having primary, secondary or tertiary amino groups, with the organic sulfonic acid. This complex may be made by first reacting a salt of the organic sulfonic acid, such as the sodium salt, with a cation exchange resin in hydrogen form to produce the sulfonic acid and then reacting the acid so formed with the acid adsorbing resin. This reaction may be represented as follows:

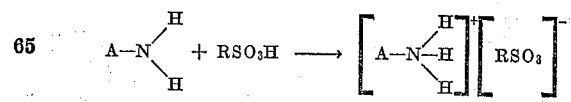

Another form of complex which is also effective in the treatment of ulcerative conditions but in which the surface active portion is more strongly held, is obtained by reacting a strong base acid adsorbing resin, such as a quaternary ammonium anion exchange resin, with either the organic sulfonic acid or its salt. This reaction may be represented as follows:

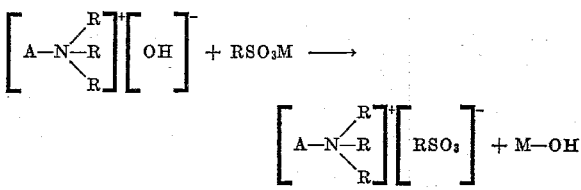

In the above formula (A) represents a resin nucleus such as a phenolaldehyde or phenolketone condensation product having amino or imino or tertiary amine groups represented by —NH₂, —NHR, —NR'R" where R represents an aliphatic, alicyclic or aromatic or alkyl-aryl residue and M a metal or ammonium ion.

Another form of the complex results from the use of acid adsorbing resins which have been treated with a dilute solution of a soluble aluminum salt such as, for example, the sulfate. In this case the resin takes up the elements of aluminum sulfate and a deep seated reaction occurs by which both the aluminum and the sulfate are bound to the resin. This product is used industrially as an adsorbent for fluoride ions in water purification. It can also adsorb the organic sulfonic acids and the organic sulfate mono-esters, inhibitors of lysozyme, described here. Such a saturated complex contains, in addition to the aluminum and the resin, adsorbed sulfate and adsorbed organic sulfonic acid and/or organic sulfate mono-esters. If it is desired to remove from the "aluminized" resin the adsorbed sulfate groups introduced by treating the resin with aluminum sulfate, these can be removed without disturbing the bound aluminum by treating the resin saturated with aluminum sulfate, with dilute sodium carbonate solution until all soluble sulfate is removed. The washed product may now be saturated with organic sulfonic acid and/or organic sulfate mono-esters to give a complex suitable for treatment of ulcerative conditions of the gastro-intestinal tract.

The term "acid adsorbing resin" as used in this specification is to be understood as including what are commonly called anion exchange resins, thus covering resins containing no attached anion, those in free base form, and those which contain an anion of a weak acid. Acid adsorbing resins which may be utilized in the present invention are numerous and include those resins in which the acid adsorption or acid neutralization depends upon, for example, the presence in the resin of aromatic or aliphatic primary, secondary or tertiary amino groups, or the quaternary ammonium group structures. They may be amine aldehyde or amine ketone condensation products. Such amine resins are referred to in this specification as polyamine acid adsorbing resins. One type of acid adsorbing resin which has given satisfactory results is sold by Rohm and Haas under the trade name XE–58. This is a weak base polyamine anion exchange resin. More particularly it is a polyethylene polyamine methylene substituted resin of diphenylol dimethyl methane and formaldehyde. The polyamine acid adsorbing resins disclosed in United States Patent 2,402,384 have also been highly satisfactory.

In addition to the particular type of polyamine aldehyde resin used in the examples cited here, other acid adsorbing resins may be used provided, of course, that they have sufficient adsorbing capacity for the surface active agent and are physiologically innocuous. For example, a metaphenylene diamine-formaldehyde acid adsorbing resin could have been used although its adsorbing capacity is somewhat lower than that of the resin given in the examples. Still other acid adsorbing resins may be employed such as acid adsorbing resins prepared from amines and polysaccharides, ethanolamine alkyd resins, alkylated aromatic diamines, aromatic diamines both unmodified and modified by incorporating into the resin molecular structure during preparation alkyl groups to form quaternary ammonium bases. Also amine resins cocondensed with aliphatic polyamines or with polyimines may be used, or amine resins treated during preparation with cyanamide or with dicyandiamide, thus introducing the strongly basic guanidine group. Acid adsorbing resins prepared by reacting aliphatic polyamines with polyhalogen derivatives of hydrocarbons may be used, as well as acid adsorbing modified phenolic resins. In all cases, the resin should be physiologically innocuous or inert, sparingly soluble or insoluble in water and in dilute acids or bases.

The compositions of this invention may be used as such, or they may be intermixed with other pharmaceutically compatible ingredients or excipients. For example, it may be desired to give it in capsules, pills, tablets, or as a powder, or even in syrups, elixirs, or emulsions. They may be intermixed with flavoring and coloring materials, clay, bentonite, antacids such as magnesium or aluminum oxide, aluminum phosphates, basic aluminum amino acetate, and analogues and the like, or bismuth suboxide, or bismuth or zirconium subcarbonates, emollients such as methyl cellulose, gastric mucin, carboxy methyl cellulose, sodium carboxy methyl cellulose, sulfated gluten and the like, or with naturally occurring gums and mucilages, gelatin, amino acids and their salts, peptones, peptides, or with any other ingredients cooperative therewith or not incompatible therewith.

EXAMPLE I

*A weak base acid adsorbing resin having adsorbed thereon anions of "Aerosol OT"*

("Aerosol OT," made by American Cyanamid Company, U. S. Patent No. 2,028,091, is the sodium salt of dioctyl sulfosuccinic acid.

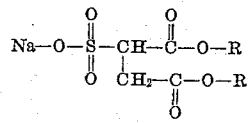

In the above formula R is the normal primary octyl group, —$C_8H_{17}$.)

The complex is prepared as follows:

A filtered aqueous solution of "Aerosol OT" in distilled water was prepared containing 40 grams of the "Aerosol OT" (100%) dissolved in 1500 ml. of distilled water. This solution was allowed to flow through a filter containing, in moist form, 80 grams (dry weight) of cation exchange resin in acid or "hydrogen" form. The effluent from this filter was strongly acid and was passed through a similar filter containing 15 grams, dry weight, of powdered XE–58 acid adsorbing resin in moist condition. The rate at which the solutions were permitted to flow through the two filters was about 10–12 ml. per minute. The effluent from the XE–58 resin bed was re-circulated through the cation exchange filter and then through the XE–58 resin filter. In all, the solution was circulated five times through the two filters. The final solution was acid to Congo paper.

The saturated XE–58 resin complex bed was sucked as free as possible from solution and was washed four times with suction, using 100 ml. portions of distilled water. The product was dried in air at room temperature, followed by drying at 45–50° C. to constant weight.

The final product, a yellow powder scarcely distinguishable in color from XE–58 resin, weighed 39.24 grams. Since we started with 15 grams of XE–58 resin, the final product contained 24.24 grams of sulfonic acid from the sodium salt of "Aerosol OT" adsorbed to 15 grams of XE–58 acid adsorbing resin. Thus, the final product contained 61.7% of sulfonic acid and 38.3% of XE–58 resin. Product was ground to pass a 100 mesh screen.

The complex is insoluble in water and is hydrolyzed by the fluids of the alimentary tract to an anion exchange resin and to a soluble surface active agent which is an effective lysozyme inhibitor. The complex is useful in the treatment of ulcerative diseases of the digestive tract.

This application is a continuation-in-part of my co-pending application Serial No. 145,320, filed February 20, 1950, now abandoned, which in turn is a continuation-in-part of my co-pending application Serial No. 22,961, filed April 23, 1948, Patent No. 2,645,627, July 14, 1953.

While I have described certain preferred embodiments of my invention, many modifications thereof may be made without departing from the spirit of the invention; and I do not wish to be limited to the detailed examples, formulas and proportions of ingredients herein set forth, but desire to avail myself of all changes within the scope of the appended claim.

I claim:

A complex produced by passing an aqueous solution of dioctyl sulfosuccinic acid through a bed of a weak base polyamine anion exchange resin until the resin takes up sufficient weight of dioctyl sulfosuccinic acid so as to constitute a complex which on hydrolysis produces a soluble surface active agent which is an effective lysozyme inhibitor, said resin being a weak base polyamine anion exchange resin in which the amine groups are selected from the type consisting of primary, secondary and tertiary amine groups.

References Cited in the file of this patent
UNITED STATES PATENTS

| | | |
|---|---|---|
| 2,119,189 | Widmer | May 31, 1938 |
| 2,581,035 | Martin et al. | Jan. 1, 1952 |
| 2,645,627 | Gustus | July 14, 1953 |

OTHER REFERENCES

Bennett: Practical Emulsions, Chem. Publ. Co., 1947, pp. 78 to 84. Copy in Div. 64.

Samuelson et al.: Svensk Kemisk Tidskrift, vol. 59, pp. 244–253, 1947; copy in Dept. of Agriculture.

Yorston: Pulp and Paper Magazine of Canada; vol. 50, No. 12; November 1949; page 108.

Samuelson: Ion Exchangers in Analytical Chemistry, Wiley, 1953, pages 191 and 195.

Richardson, "Nature," vol. 164, No. 4178, pp. 916–917, November 26, 1949. (Copy in Sci. Library.)